United States Patent
Sanroma et al.

(10) Patent No.: US 6,967,285 B2
(45) Date of Patent: Nov. 22, 2005

(54) LOW INSERTION FORCE SEATING GROMMET ASSEMBLY

(75) Inventors: John P. Sanroma, Billerica, MA (US); Glenn R. Freeman, Jr., Beverly, MA (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 11/041,056

(22) Filed: Jan. 21, 2005

(65) Prior Publication Data

US 2005/0115019 A1    Jun. 2, 2005

(51) Int. Cl.[7] ............................................. H02G 3/18
(52) U.S. Cl. .............................. 174/65 G; 174/152 G; 174/153 G; 16/2.1; 16/2.2; 248/56
(58) Field of Search ............................ 174/65 G, 135, 174/142, 152 R, 152 G, 153 G, 72 A; 16/2.1, 16/2.2; 248/56; 439/604, 587, 274, 275

(56) References Cited

U.S. PATENT DOCUMENTS

| | | | |
|---|---|---|---|
| 2,225,472 A | 12/1940 | Franklin | 16/2 |
| 2,375,373 A | 5/1945 | Leathers | 174/153 G |
| 3,244,802 A | 4/1966 | Sturtevant et al. | 174/153 G |
| 3,372,960 A | 3/1968 | Fisher | 174/153 G |
| 4,041,241 A | 8/1977 | Olmstead et al. | 174/153 G |
| 4,232,421 A * | 11/1980 | Tucker | 16/2.2 |
| 4,685,173 A | 8/1987 | Pavur | 16/2 |
| 5,337,447 A | 8/1994 | Tanaka et al. | 16/2 |
| 5,353,472 A | 10/1994 | Benda et al. | 16/2 |
| 5,452,494 A | 9/1995 | Wright | 16/2 |
| 5,526,549 A | 6/1996 | Mori et al. | 16/2 |
| 5,531,459 A * | 7/1996 | Fukuda et al. | 174/153 G |
| 5,732,440 A | 3/1998 | Wright | 16/2.2 |
| 5,774,934 A * | 7/1998 | Fujita et al. | 16/2.1 |
| 6,058,562 A * | 5/2000 | Satou et al. | 16/2.1 |
| 6,278,060 B1 * | 8/2001 | Mori | 174/65 G |
| 6,372,995 B1 * | 4/2002 | Mochizuki et al. | 174/152 G |
| 6,486,400 B1 * | 11/2002 | Smutny et al. | 174/65 G |
| 6,495,767 B2 * | 12/2002 | Okuhara et al. | 174/152 G |
| 6,815,615 B1 * | 11/2004 | Wagner et al. | 174/65 G |

* cited by examiner

*Primary Examiner*—Angel R. Estrada
(74) *Attorney, Agent, or Firm*—Carlo S. Bessone

(57) ABSTRACT

A low insertion force seating grommet assembly (10*a*) has a hollow body (12) arrayed along a longitudinal axis (14). The body (12) has a wide end (16) and a narrow end (18) connected by an intermediate portion (20). The narrow end (18) has a cylindrical aperture (18*a*) and the wide end (16) has a cup-shaped aperture (16*a*). A flange (22) surrounds the wide end (16) and is provided with a wall-opening engaging portion (24). Longitudinally extending relief grooves (26) are formed on the internal surface (28) of the cup-shaped aperture (18*a*). A cable (32) is frictionally engaged in the cylindrical aperture and penetrates the cup-shaped aperture. A cover (30) closes the cup-shaped aperture. The cable enters the cover along the longitudinal axis and exits the cover at an angle of 90 degrees relative to the longitudinal axis.

5 Claims, 5 Drawing Sheets

LOW INSERTION FORCE SEATING GROMMET ASSEMBLY

TECHNICAL FIELD

This invention relates to seating grommets and more particularly to seating grommets having a reduced pull-through or seating force.

BACKGROUND ART

Prior art seating grommets have comprised relatively massive, solid, hemispherical components of a flexible material such as rubber. See, for example, U.S. Pat. No. 2,225,472. The grommet would be provided with a groove for engaging a wall, usually combined with a flange for inhibiting pull-through. Such grommets frequently required a setting force of up to 75 pounds. As the areas in which these grommets have been employed have been reduced in size (for example, in automobiles) it has become more difficult to find the room necessary to exert such pulling force. Improved grommets having a lesser setting force have been proposed wherein the flexible portion is substantially hollow. Examples of the latter grommets are shown U.S. Pat. Nos. 2,375,373; 3,244,802; 3,372,960; 4,041,241; 4,685,173; 5,337,447; 5,452,494; and 5,732,440. The latter two patents are assigned to the assignee of the present invention. While some of these latter grommets worked well in certain situations, it has become necessary and desirable to reduce the insertion or setting force still further, so that seating grommets could be sued in even smaller environments.

DISCLOSURE OF INVENTION

It is, therefore, an object of the invention to obviate the disadvantages of the prior art.

It is another object of the invention to enhance the use of seating grommets.

Yet another embodiment of the invention is the reduction of the seating force of a grommet.

Still another object of the invention is the reduction of the seating force while substantially preventing the grommet from being accidentally pulled to far through the opening it is meant to seal.

These objects are accomplished, in one aspect of the invention, by a low insertion force seating grommet comprising a hollow body arrayed along a longitudinal axis. The body has a wide end and a narrow end connected by an intermediate portion. The narrow end has a cylindrical aperture and the wide end has a cup-shaped aperture. A flange surrounds the wide end and is provided with a wall-opening engaging portion. A plurality of longitudinally extending relief grooves are formed on the internal surface of the cup-shaped aperture.

Other objects are accomplished, in another aspect of the invention by a low insertion force seating grommet assembly comprising a hollow body arrayed along a longitudinal axis. The body has a wide end and a narrow end connected by an intermediate portion. The narrow end has a cylindrical aperture and the wide end has a cup-shaped aperture. A flange surrounds the wide end and is provided with a wall-opening engaging portion. A plurality of longitudinally extending relief grooves are formed on the internal surface of the cup-shaped aperture. A cable is frictionally engaged in the cylindrical aperture and penetrates the cup-shaped aperture. A cover closes the cup-shaped aperture. The cable enters the cover along the longitudinal axis and exits the cover at an angle of 90 degrees relative to the longitudinal axis.

BEST MODE FOR CARRYING OUT THE INVENTION

Figure 1:
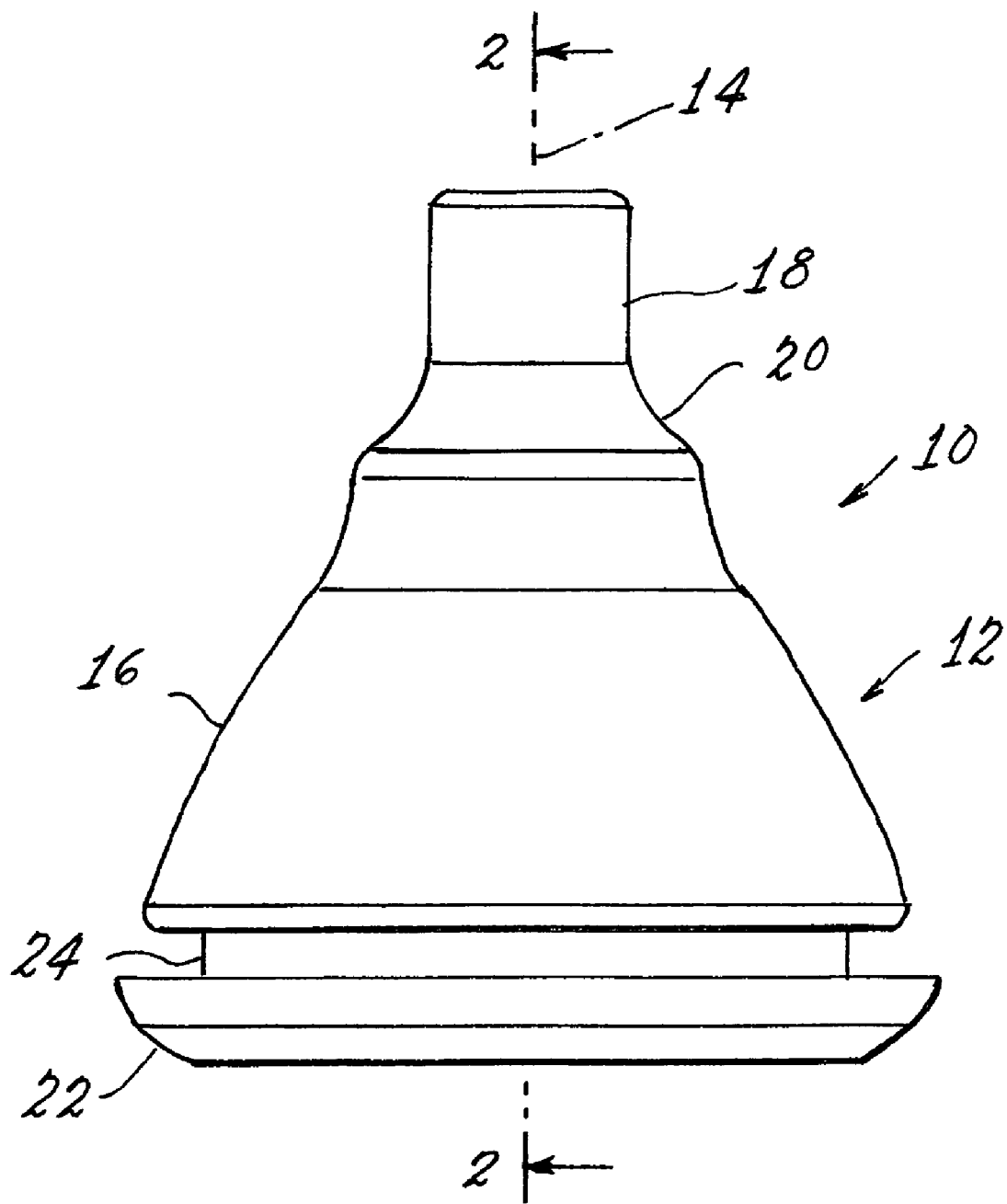
FIG. 1 is a plan view of an embodiment of the invention.
Figure 2:
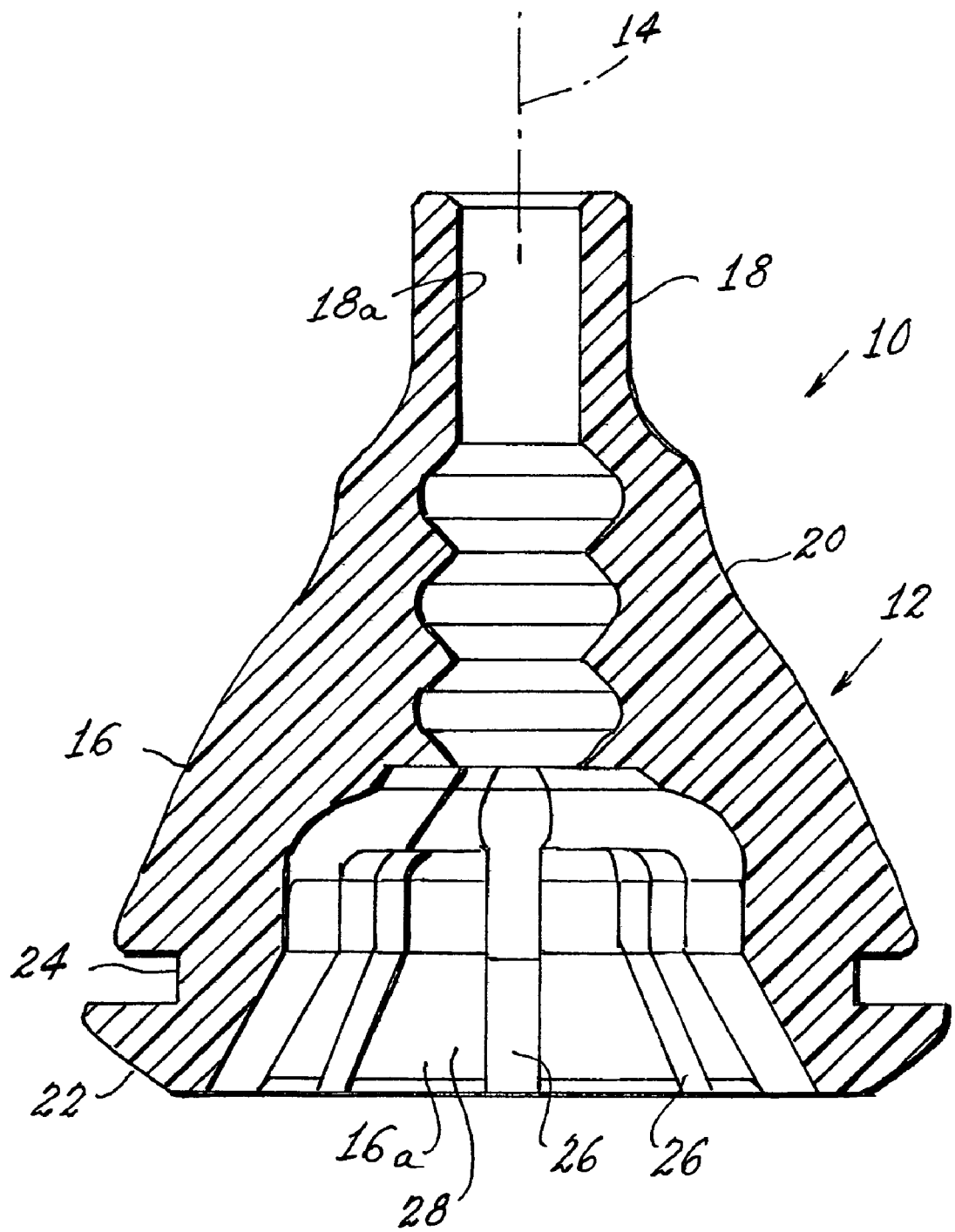
FIG. 2 is a sectional view taken along the line 2—2 of FIG. 1.
Figure 3:
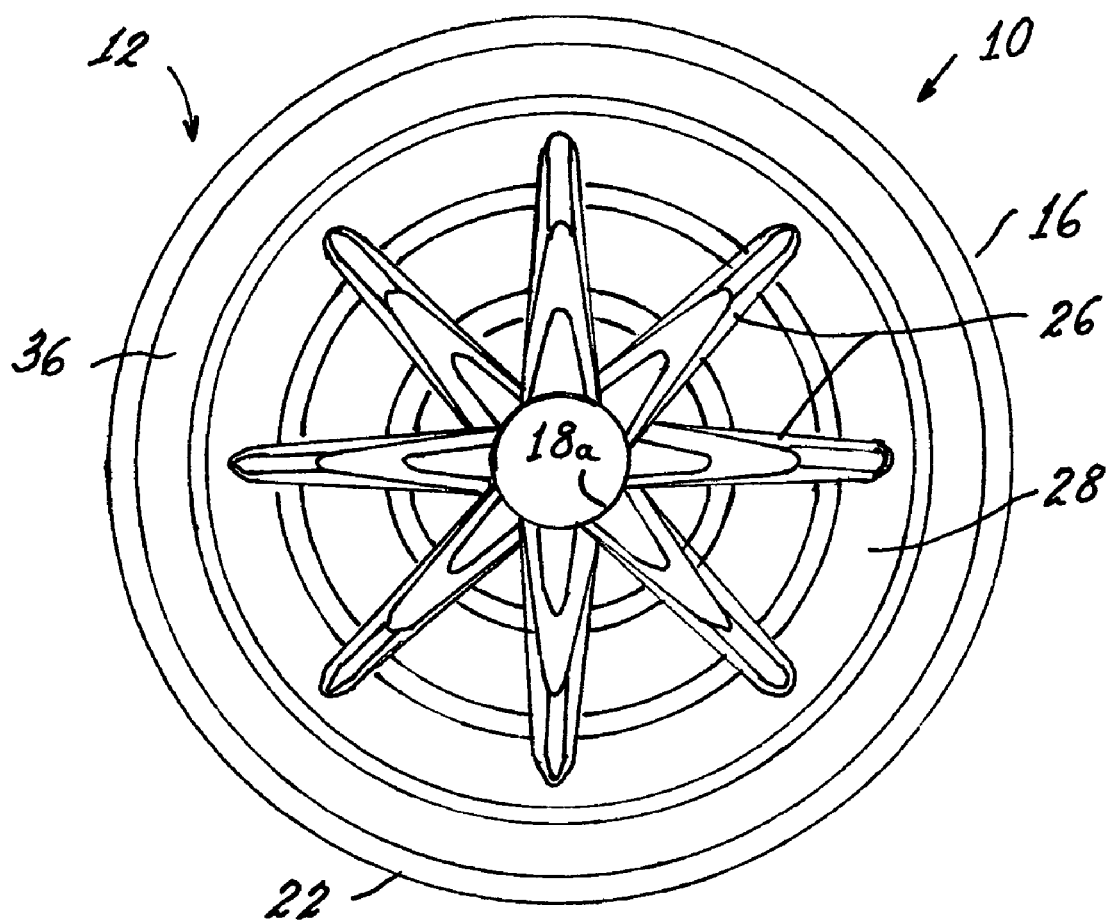
FIG. 3 is an end view of an embodiment of the invention.
Figure 4:
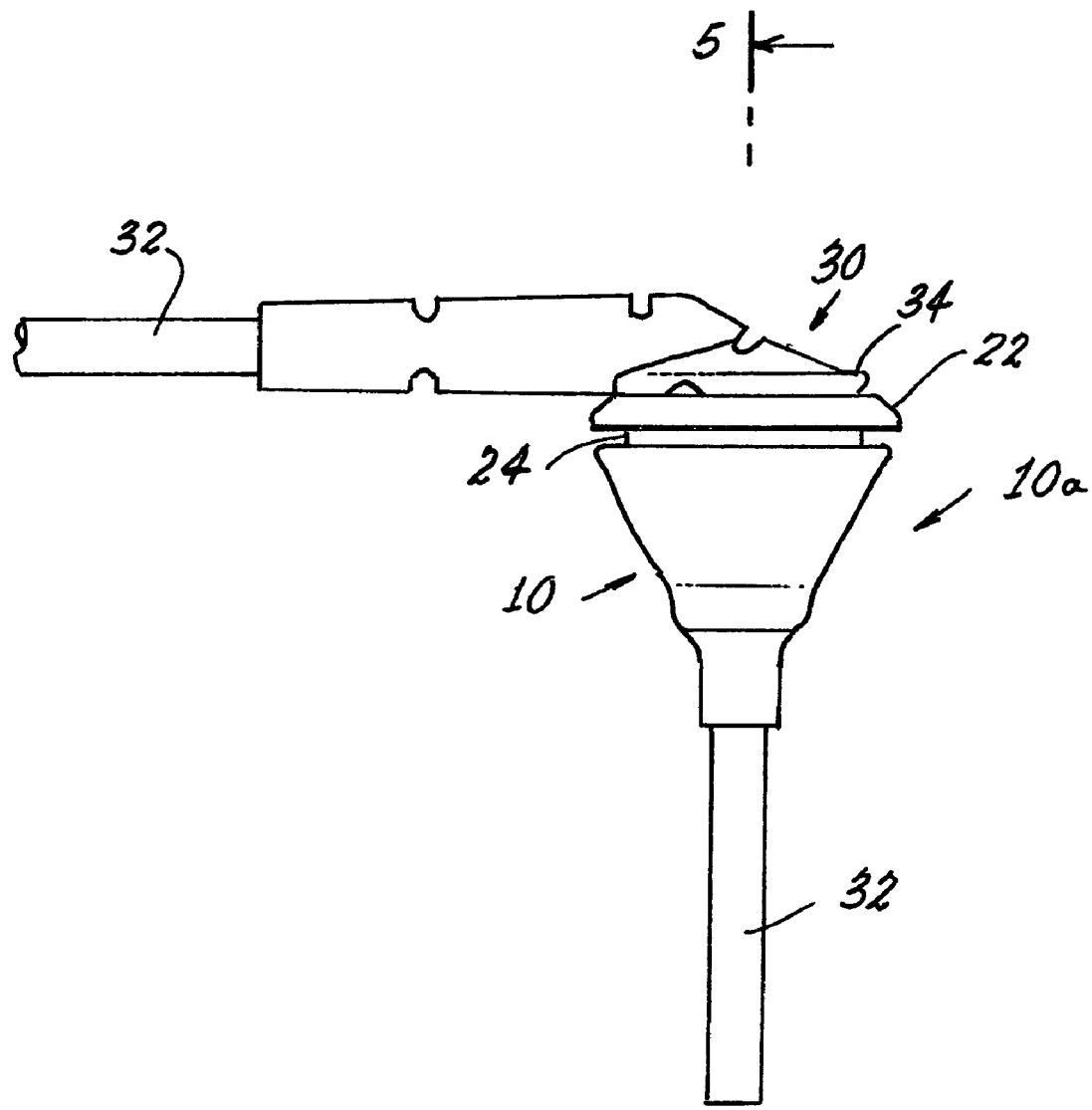
FIG. 4 is a plan view of an additional embodiment of the invention.

For a better understanding of the present invention, together with other and further objects, advantages and capabilities thereof, reference is made to the following disclosure and appended claims taken in conjunction with the above-described drawings.

Referring now to the drawings with greater particularity; there is shown in FIGS. 1–4 a low insertion force seating grommet 10 comprising a hollow body 12 arrayed along a longitudinal axis 14. The body 12 has a wide end 16 and a narrow end 18 connected by an intermediate portion 20. The narrow end 18 has a cylindrical aperture 18a therethrough and the wide end 16 has a cup-shaped aperture 16a. A flange 22 surrounds the wide end 16 and is provided with a wall-opening engaging portion 24. Longitudinally extending relief grooves 26 are formed on the internal surface 28 of the cup-shaped aperture 16a and extend from the outer edge of the wide end 16 to the bottom or terminal area of the cup-shaped aperture 16a.

While various configurations and numbers are possible for the grooves 26, in a preferred embodiment of the invention the longitudinally extending relief grooves are V-shaped and are eight in number, spaced 45 degrees apart.

Figure 5:
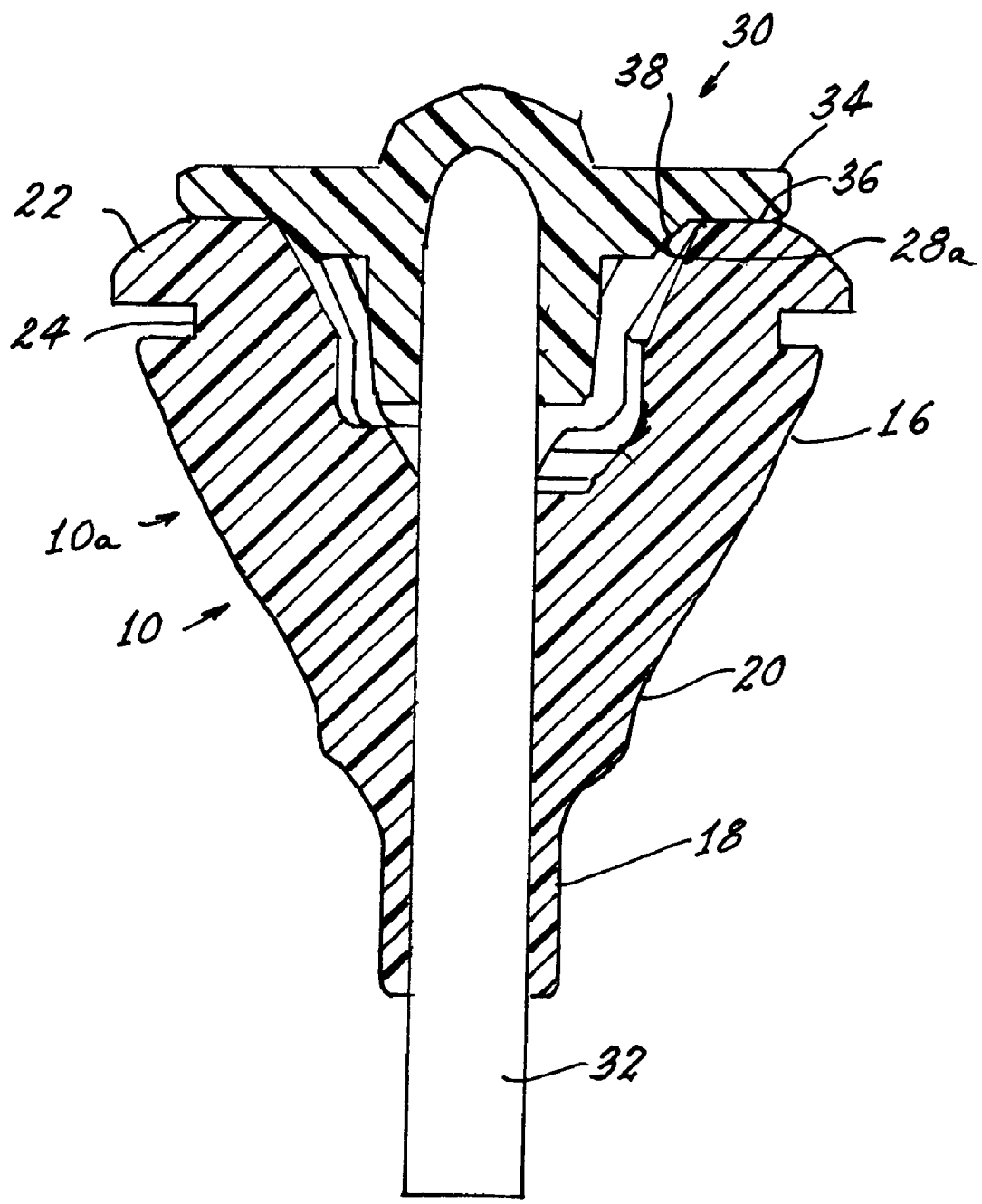
FIG. 5 is a sectional view taken along the line 5—5 of FIG. 4.

In an additional embodiment of the invention, shown in FIGS. 5 and 6, there is provided a low insertion force seating grommet assembly 10a comprising a grommet 10 and a cover 30 closing the cup-shaped aperture 16a. A cable 32 enters the cover 30 along the longitudinal axis 14 and exits the cover 30 at an angle of 90 degrees relative to longitudinal axis 14.

The cover 30 has a circumferential disk 34 that engages an outer surface 36 of the flange 22 and an internal cone 38 that engages a portion 28a of the inner surface 28 of the cup-shaped aperture 18a.

The relief grooves 26 allow the grommet 10 to posses a relatively substantial wall thickness to insure long life and adequate protection while permitting ease of assembly. While more conventional grommets available on the open market can have insertion values on the order of 25 pounds, the grommet described herein has an insertion value of only 12 pounds.

The seating grommet assembly 10a comprising the grommet 10 and the cover 30 provides additional advantages, namely, the addition of the cover 30 which directs the enclosed cable at a 90 degree angle away from the direction in which the grommet would be inserted (i.e., along longitudinal axis 14) and makes it practically impossible to pull the grommet through its appointed opening.

A suitable material for the grommet 10 is silicone rubber, while the cover 30 can be a harder material, such as Nylon 66.

While there have been shown and described what are present considered to be the preferred embodiments of the invention, it will be apparent to those skilled in the art that various changes and modifications can be made herein without departing from the scope of the invention as defined by the appended claims.

What is claimed is:

1. A low insertion force seating grommet assembly comprising:
   a hollow body arrayed along a longitudinal axis, said body having a wide end and a narrow end connected by an intermediate portion, said narrow end having a cylindrical aperture and said wide end having a cup-shaped aperture;
   a flange surrounding said wide end provided with a wall engaging portion;
   a plurality of longitudinally extending relief grooves formed on the internal surface of said cup-shaped aperture;
   a cable frictionally engaged in said cylindrical aperture and penetrating said cup-shaped aperture; and
   a cover closing said cup-shaped aperture, said cable entering said cover along said longitudinal axis and exiting said cover at an angle of 90 degrees relative to said longitudinal axis.

2. The low insertion force seating grommet assembly of claim 1 wherein said cover has a circumferential disk engaging an outer surface of said flange and an internal cone engaging an inner surface of said cup-shaped aperture.

3. The low insertion force seating grommet assembly of claim 1 wherein said longitudinally extending relief grooves are V-shaped.

4. The low insertion force seating grommet assembly of claim 3 wherein there are 8 longitudinally extending relief grooves equally spaced about the circumference of said cup-shaped aperture.

5. The low insertion force seating grommet assembly of claim 4 wherein said intermediate portion is provided with at least one chamber having a diameter greater than the diameter of said cylindrical aperture.

* * * * *